Figure 1:
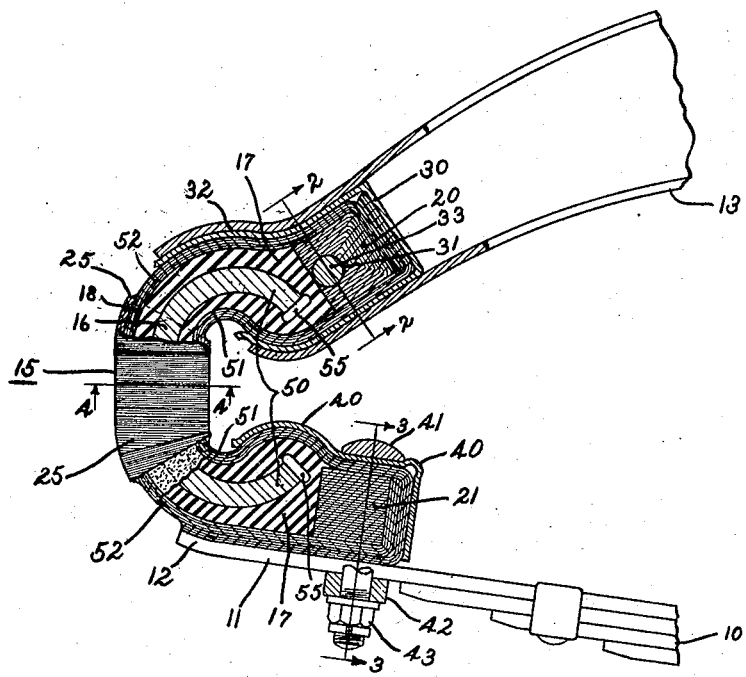

July 10, 1928.

H. D. GEYER

SPRING SHACKLE

Filed Oct. 16, 1926

1,676,489

Inventor
Harvey D. Geyer
By Spencer Hardman & Feh.
Attorney

Patented July 10, 1928.

1,676,489

UNITED STATES PATENT OFFICE.

HARVEY D. GEYER, OF DAYTON, OHIO, ASSIGNOR TO THE INLAND MANUFACTURING COMPANY, OF DAYTON, OHIO, A CORPORATION OF DELAWARE.

SPRING SHACKLE.

Application filed October 16, 1926. Serial No. 142,118.

This invention relates to coupling members, especially such as are used as spring shackles on vehicles.

An object of this invention is to provide an improved form of coupling member containing flexible rubber wherein all movement is taken by the internal distortion of the rubber, thereby avoiding the necessity of lubrication and other disadvantages of ordinary metal shackles.

Another object is to provide an extremely simple form of rubber spring shackle having the advantages of small cost of manufacture and assembling in place upon the parts connected thereby, efficiency of operation, long life, and neatness of appearance.

Further objects and advantages of the present invention will be apparent from the following description, reference being had to the accompanying drawings, wherein a preferred form of embodiment of the present invention is clearly shown.

In the drawings:

Fig. 1 illustrates a shackle built according to this invention mounted on the rear end of the rear spring of an automobile chassis. The two end portions of the shackle are shown in vertical section on the center line thereof while the central portion is shown in elevation.

Figure 2:
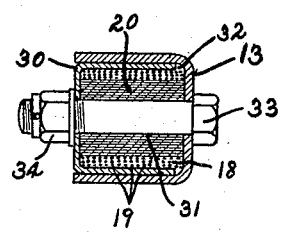
Figure 3:
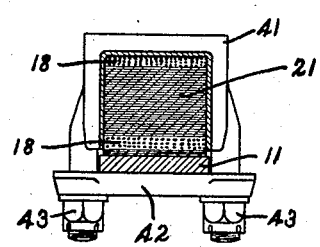
Figure 4:
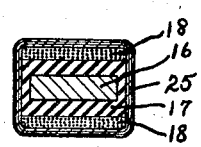

Fig. 2 is a section on line 2—2 of Fig. 1.
Fig. 3 is a section on line 3—3 of Fig. 1.
Fig. 4 is a section on line 4—4 of Fig. 1.

Similar reference characters refer to similar parts throughout the several views.

Numeral 10 designates the leaf spring in its entirety and 11 is the projecting end of the long leaf thereof. 13 is the side channel rail of the chassis frame, only a small portion thereof being shown.

The molded unit, indicated as a whole by 15, comprises a substantially C-shaped curved metal insert 16 completely surrounded by the flexible rubber block 17, and the rubberized fabric casing 18 which extends around the periphery of the entire molded unit 15. Preferably casing 18 is composed of rubberized cord fabric with the cords 19 thereof extending in the peripheral direction around the unit 15, as has been illustrated in the drawing. The ends 20 and 21 of the molded unit 15 are built up from rubberized fabric and cured in the mold to a hardness which renders them quite hard and rigid but at the same time the rubber block 17 and the cord casing 18 are cured to only such degree as to leave them quite flexible. The central portion of unit 15 is preferably provided with a rubberized cord fabric casing 25 wrapped transversely around the outside of the casing 18 to protect the soft rubber block 17 and to prevent lateral bulging thereof in use. This entire unit 15 is vulcanized in a mold substantially to the shape shown in the drawings.

After vulcanization, the upper portion of unit 15 is pressed laterally into the open side of the pressed metal housing 30 which is correspondingly shaped, as clearly shown in Fig. 1, to fit quite snugly about said upper portion. A bolt hole 31 through the relatively hard end 20 of unit 15 may be either molded therein by means of a core or drilled therein after vulcanization, as desired. Now to secure the upper housed end of unit 15 to the side channel 13, the open side of the housing 30 is slipped laterally into the correspondingly shaped recess 32 provided therefor in the channel 13 by the suitable shaping of the flanges of said channel 13. The bolt 33 is next inserted and nut 34 tightened to firmly clamp the end 20 of the molded unit 15 between the housing 30 and the channel 13 (see Fig. 2).

The lower end of unit 15 is provided with a pressed metal housing 40 which fits snugly around the relatively hard end 21 thereof and is firmly clamped down upon the top of the long leaf 11 by the U-bolt 41, the cross clip 42, and nuts 43. The U-bolt 41 is used instead of a bolt extending through a hole in leaf 11 to avoid piercing the leaf 11 and thereby weaken the same. The slightly up-turned end 12 of leaf 11 assists the U-bolt 41 in securing the unit 15 to the leaf 11, as will be clear to those skilled in the art.

In operation, when the end of spring 10 moves longitudinally relative to the side rail 13, the metal insert 16 swings angularly by its curved ends 50 pivoting within the flexible rubber block 17 by internal distortion of the rubber. Of course the central portion of unit 15 which is covered by the fabric casing 25 also swings with the C-shaped metal insert 16, the flexing of the cord fabric casing 18 at the portions 51 and 52 permitting such swinging. The soft rubber block 17 is completely encased at its two ends, where its greatest internal distortion takes place, by the metal housings 30 and 40 respectively. It is also completely encased at its central portion by the transverse fabric casing 25. The lateral edges of block 17 at the portions 51 and 52 are however left unencased in order that the unit 15 may be easily flexed at these portions without any buckling or excessive strain upon the fabric casing.

Preferably holes 55 are provided in the soft rubber block 17 at the ends of the C-shaped insert 16, as clearly shown in Fig. 1, in order to permit easier pivoting of the curved ends 50 within the soft rubber as described above.

While the form of embodiment of the present invention as herein disclosed, constitutes a preferred form, it is to be understood that other forms might be adopted, all coming within the scope of the claims which follow.

What is claimed is as follows:

1. In combination with the spring and frame member of a vehicle, a shackle comprising; a molded rubber unit having an interior metal insert, a soft rubber body and rubberized fabric extending around the periphery of said rubber body, said molded unit having one end thereof rigidly fixed to the vehicle spring and the other end thereof rigidly fixed to the frame member.

2. In combination, an extension shackle connecting two relatively movable members, said shackle comprising a molded rubber unit having the opposite ends thereof fixed respectively to said movable members, said molded unit having a relatively rigid metal insert therein extending between points adjacent the opposite ends of said molded unit and arranged to transmit the load imposed upon said molded unit, and a rubberized fabric casing extending transversely about the central portion of said molded unit.

3. In an extension shackle connecting two relatively movable members, a molded rubber unit having the opposite ends thereof fixed to said movable members, said molded unit having a rubberized fabric casing molded in place about the central portion of said molded unit.

4. In an extension shackle connecting two relatively movable members, a molded rubber unit having the opposite ends thereof fixed to said movable members, said molded unit having a metal insert extending longitudinally of said unit to points adjacent the two ends thereof, said insert having laterally extending end portions whereby the bearing area of the ends of said insert is increased.

5. In combination with a frame member and a supporting leaf spring, an extension shackle comprising: a molded rubber unit having one end thereof lying upon and fixed in place upon said leaf spring, and having the opposite end thereof conforming in shape to and rigidly clamped upon said frame member.

6. In combination with a frame member and a supporting leaf spring, an extension shackle comprising: a molded rubber unit having one end thereof lying upon and fixed in place upon said leaf spring, and having the opposite end thereof conforming in shape to and rigidly clamped upon said frame member, and an isolated metal insert extending longitudinally within said molded unit to transmit the load through the central portion of said unit.

7. In combination with a member and a supporting spring, an extension shackle comprising: a molded rubber unit having a substantially C-shaped metal insert molded therein.

8. In combination with a member and a supporting spring, an extension shackle comprising: a molded rubber unit having a substantially C-shaped metal insert molded therein, and a molded rubberized fabric casing therefor.

9. In combination with a member and a supporting spring, an extension shackle comprising: a molded rubber unit having a substantially C-shaped metal insert molded therein, a flexible rubber member enclosing said metal insert and a rubberized fabric casing enclosing said flexible rubber member.

10. In combination with a member and a supporting spring, an extension shackle comprising: a molded rubber unit having a substantially C-shaped metal insert molded therein, a flexible rubber member enclosing said metal insert and a rubberized fabric casing enclosing said flexible rubber member, and having semi-rigid end portions whereby the ends of said molded unit may be fixed in place upon said spring and first mentioned member.

11. In combination with a member and a spring, a shackle therebetween including a molded rubber unit having its opposite ends fixed respectively to said member and spring, said member having an open-sided pocket to receive a correspondingly-shaped end of said molded unit, whereby said molded unit is more securely fixed to said member.

In testimony whereof I hereto affix my signature.

HARVEY D. GEYER.